United States Patent [19]

MacFarlane et al.

[11] Patent Number: 5,628,801
[45] Date of Patent: May 13, 1997

[54] ELECTROLYTE CAPACITOR AND METHOD OF MAKING THE SAME

[75] Inventors: Douglas R. MacFarlane, Elsternwick; Paul D. Lunsmann, Birchgrove, both of Australia

[73] Assignee: Specialized Conductives Pty. Limited, South Victoria, Australia

[21] Appl. No.: 235,179

[22] Filed: May 2, 1994

[51] Int. Cl.$^6$ .................................................. H01G 9/02
[52] U.S. Cl. ............................................................ 29/25.03
[58] Field of Search ........................ 29/25.03; 361/525, 361/526

[56] References Cited

U.S. PATENT DOCUMENTS

| | | |
|---|---|---|
| 3,940,667 | 2/1976 | Pearce . |
| 4,099,218 | 7/1978 | Klein et al. . |
| 4,480,290 | 10/1984 | Constanti et al. . |
| 4,803,596 | 2/1989 | Hellwig et al. . |
| 4,959,753 | 9/1990 | Kudoh et al. ........................ 29/25.03 |
| 5,146,391 | 9/1992 | MacFarlane et al. . |

FOREIGN PATENT DOCUMENTS

| | | |
|---|---|---|
| 54-3213 | 2/1979 | Japan . |
| 132619 | 2/1989 | Japan . |
| 274019 | 3/1990 | Japan . |
| 3200313 | 9/1991 | Japan . |

*Primary Examiner*—George Fourson
*Attorney, Agent, or Firm*—Gottlieb, Rackman & Reisman, P.C.

[57] ABSTRACT

A substantially flat electrolytic capacitor capable of retaining several joules of energy has anode and cathodes held together by a solid or elastomeric solid adhesive which is also the electrolyte within the capacitor.

4 Claims, 1 Drawing Sheet

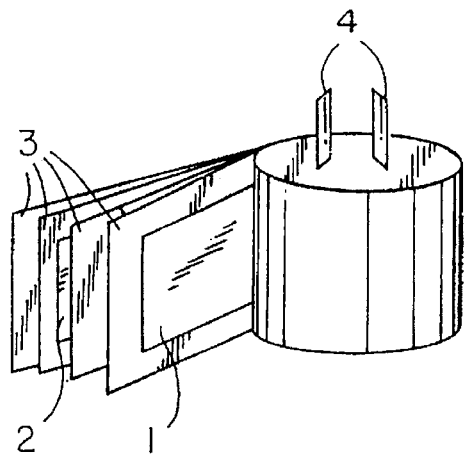
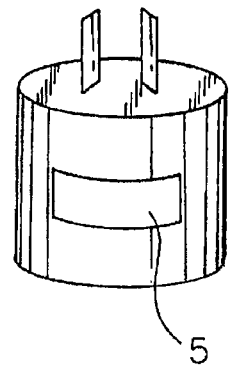
FIG. 1
PRIOR ART
FIG. 1a
PRIOR ART
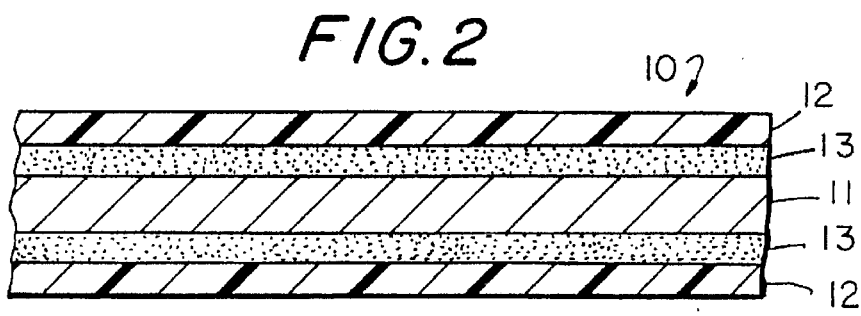
FIG. 2
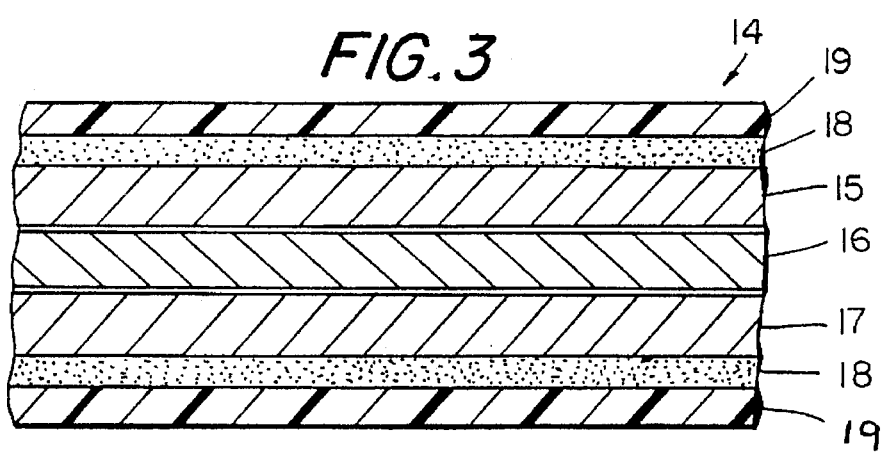
FIG. 3

ELECTROLYTE CAPACITOR AND METHOD OF MAKING THE SAME

TECHNICAL FIELD

This invention relates to electrolytic capacitors and batteries. More particularly although not necessarily limited to such, it relates to electrolytic capacitors which utilize a solid electrolyte and to methods of making such capacitors. A major feature of these capacitors is that they employ a solid electrolyte that also acts as an adhesive to hold the capacitor together. The invention finds particular suitability for use in implantable biomedical electronic device is such as cardiac pacemakers and defibrillators.

BACKGROUND ART

Cardiac defibrillators and pacemakers are commonly designed to be implanted within a human patient. The cardiac defibrillators include an electrical energy storage component as part of a power supply designed to provide repeated burst discharges of several joules of electrical energy. Cardiac pacemakers supply lower energy bursts but much more frequently. Both devices therefore require energy storage components of large capacity in order to reduce the number of occasions when the device must be explanted to renew its energy storage component. It is advantageous that the energy storage component be compact and capable of large energy storage. It is advantageous if the energy storage component can be configured to the shape of the overall device which is typically a flat disc shaped configuration to facilitate implantation subcutaneously in the patient. It is well known that electrolytic capacitors have some properties that are suited for this purpose.

Electrolytic capacitors are normally made by tightly winding an etched aluminum foil anode, a Kraft paper or fabric gauze separator and cathode and holding the roll together with an adhesive tape. Connections to the anode and electrode are made via tabs.

Such capacitors are inherently thick and where they employ liquid electrolyte are subject to leakage, which can damage electrical components and lead to failure of the device. Sealing the device hermetically is not an adequate solution of this problem because of gases may build up within the device. Expansion chambers to receive the gases have been provided to deal with such problems, but that has lead to the disadvantage of even a larger size for the capacitor. Electrolytic capacitors rely upon an oxide layer that forms on the typically aluminum anode. This oxide layer is a dielectric layer between the anode and cathode. The liquid electrolyte causes the de-forming of the aluminum oxide layer present on the aluminum anode. Although the potential across the electrodes can result in currents that re-form the oxide layer, the de-formation results in a shorter lifetime of the formed oxide layer.

Polymeric material between the anode and cathode is known. U.S. Pat. No. 3,555,369 proposed replacing the kraft paper spacer with a semipermeable membrane of a polymeric material. However this required that the membrane be impregnated with a solvent-based liquid electrolyte, required the hermetic sealing and the provision of expansion chambers to deal with the gas generated, and left unsolved the problem of the de-forming of the oxide layer of the capacitor.

Polymeric materials that behave similar to a solid electrolyte are also known. U.S. Pat. No. 3,883,784 proposed to produce capacitors employing a polymeric material having ionic acceptors and ionic donors. This patent suggested interposing the polymeric material in a film in place of the kraft spacer. Since the film was in fact thicker than the kraft space it did not contribute to a reduction in the size of the capacitor. Further, the '784 patent did not disclose an electrolytic capacitor and was unlikely to be capable of supporting electrolytic action at over voltages or have any ability to re-form the oxide layer on its anode. The capacitor of the '784 invention had a capacitance much smaller than electrolytic capacitors of comparable size.

Solid electrolytes are also known. U.S. Pat. No. 4,942,501, and its continuations, U.S. Pat. Nos. 5,146,391 and 5,153,820 provided an electrolytic capacitor that employed, between its anode and cathode, a layer of solid electrolyte comprising a solid solution of certain metal salts in a polymer matrix. These capacitors were immune to leakage and were smaller than prior electrolytic capacitors of comparable construction and operating properties. The preferred method of constructing the capacitors was to deposit the polymer electrolyte onto the surfaces of the anode and polymerizing the material. The cathode was formed by deposition upon the surface of the solid electrolyte layer. The construct was then wound onto a cardboard core tube into a cylindrical body and then inserted into a cylindrical housing which was sealed by an end plate.

Flat capacitors are known. U.S. Pat. No. 4,267,566 to Moresi, Jr. disclosed a capacitor comprising a planar layered structure of anode plates, cathode plates and a paper separator. This was placed in a polymeric envelope to contain the electrolyte and the structure was encased in a hermetically sealed housing. The electrolyte that was preferred was based on the liquid solvent ethylene glycol. A similar structure is describe in Research Disclosure 33236 (Published December 1991). One problem with this type of capacitor is that the cathode and anode plates must be kept in intimate contact and 'connected' by the electrolyte. This has, prior to the present invention, required a clamp as described in Research Disclosure 33236 (Published December 1991), which adds to the complexity in manufacture of the capacitor and also increases the volume of the capacitor.

Japanese Patent Application No. JP 4-184811 to Mitsubushi also discloses a solid electrolyte film having both ionic and electronic conductivity which is suitable as an electrolyte for electrolytic capacitors. The patent discloses using a porous film or a fabric integrated with the polymer to increase the mechanical and physical strength of the solid electrolyte. The details of the construction still require the use of binding materials to complete the construction.

BRIEF DESCRIPTION OF THE INVENTION

It has been discovered that the manufacturing process for a planar electrolytic capacitor employing a solid or gel electrolyte can be simplified by utilizing the electrolyte in the dual capacity of electrolyte and adhesive material to hold together the anode and cathode plates of capacitor.

It is an object of the present invention, therefore, to provide a novel method for the fabrication of improved electrolytic capacitors which, by virtue of their structural features, avoid the requirement of a clamp to hold the anode and cathode layers in intimate contact during use. This is of particular use when a flat capacitor is required.

It is a further object of the present invention to provide such a method in which adhesive can be used without a separator.

It is a still further object of the present invention to employ an adhesive electrolyte and eliminate the need for additional adhesives or clamps to maintain, after curing, inter-layer contact in capacitors having single, double, triple or more anodes.

It is a further object of the invention to apply such an adhesive electrolyte to an anode while the electrolyte is in a liquid state and as a consequence is impregnated into the irregularities in the surface of the formed anode, and then to polymerize the material in place to become both the adhesive and electrolyte.

BRIEF DESCRIPTION OF THE DRAWINGS

While the specification concludes with claims particularly defining and distinctly claiming the subject matter regarded as the invention herein, it is believed that the present invention will be more readily understood from the following description, taken in conjunction with the accompanying drawings, in which:

FIG. 1 illustrates a prior art capacitor formed in a roll construction.

FIG. 1a further illustrates the means of holding together the prior art roll construction capacitor of FIG. 1.

FIG. 2 illustrates in cross section form a flat capacitor according to the present invention.

FIG. 3 depicts an alternative embodiment of the present invention and shows a cross section of a multiple anode flat capacitor.

DETAILED DESCRIPTION OF A PREFERRED EMBODIMENT

Present electrolytic capacitors are usually constructed by tightly winding the anode, separator and cathode and holding the roll together with an adhesive tape. As shown in FIG. 1., a capacitor is made by rolling an anode foil 1, with a cathode foil 2, separated by a material such as kraft paper 3. Connections are made via tabs 4. The rolled construction is held together as indicated in FIG. 1A by a strip of adhesive tape 5.

The present invention facilitates construction of a flat capacitor as depicted in FIG. 2. Referring to FIG. 2 there is shown in exaggerated form the basic laminate or sandwich layer structure 10 which constitutes one layer of a capacitor. The drawing indicates the anode 11, usually a highly etched foil (the etching is not shown in this view). The cathode layer is indicated by layers 12. Between the cathode and anode is the adhesive indicated by layer 13. This adhesive layer may be the solid electrolyte alone or it may be a separator impregnated with the elastomeric solid electrolyte. The adhesive/electrolyte is liquid at the time of application. It is applied to fill the highly etched pores of anode 11 and to contact the whole surface area of the layer. Where a separator is present, the electrolyte saturates the separator and thus provides ionic electrical conductivity from the oxide coating on the anode to the cathode.

The anode can be formed from single, double or multiple plates. FIG. 3 depicts the basic laminate or sandwich layer structure of a multiple anode capacitor as indicated at 14.

FIG. 3 indicates the anodes 15, 16, 17, the separator 18 and cathode 19. During preparation the anode may be held in position with respect to the cathode by a press or other means. The adhesive/electrolyte in this case holds the multiple layers of anode together and provides conduction to the cathode. In this case the anode layers 15 and 17 must be porous. FIG. 3 depicts a capacitor constructed with a separator 18 filled with the adhesive, but the same principles apply in capacitors which do not have a separator, but use the adhesive only.

The class of preferred, electrolytes which may be utilized as the adhesive are found among those disclosed in U.S. Pat. No. 4,942,501, U.S. Pat. No. 5,146,391, and U.S. Pat. No. 5,153,820 all to MacFarlane et. al. Such electrolytes are constituted of a solid electrolyte comprising a solid solution of at least one salt selected from the group consisting of alkali metal salts, transition metal salts and ammonium salts of at least one acid selected from the group consisting of monobasic, dibasic and tribasic acids other than hydrohalic (haloid) acids in a polymer of high solvation power. The general principle is that the electrolyte is made from a polymer with polar groups capable of imparting to the polymer a high solvation power for the dissolving of ions. A preferred suitable material used as both the adhesive and the electrolyte consists of:

17.5 parts of Hydroxyethylmethacrylate, 32.5 parts ethylene glycol 7.0 parts ammonium adipate 6.7 parts ammonium glutarate 0.45 parts tetraethyleneglycol diacrylate 2.2 parts of initiator solution., This mixture may be used alone or may have added to it an amount of pure water, typically between and 40% preferably between 0 and 15% and most preferably between 2 and 10%.

The initiator solution consists of a solution of 3.6 g of Cu $(NO_3)_2.3H_2O$ and 42.4 g of $K_2S_2O_8$ per liter of pure water.

The capacitor assembly impregnated with its liquid electrolyte/adhesive is then heated to approximately 55° C. for at least 2 hours, but preferably 24 hours to cure the electrolyte/adhesive.

Substantially improved adhesion to the foil surfaces, for an aluminum electrolytic capacitor, is achieved when the dry capacitor components have been thoroughly de-oxygenated prior to application of the adhesive/electrolyte.

Where it is intended that the electrolyte/adhesive act as separator also, without the inclusion of any other mechanical separator, the electrolyte/adhesive film is first spread as a film, between 5 and 500 μm thick, preferably between 10 and 100 μm thick and most preferably between 15 and 50 μm thick, onto the cathode foil and cured. The coated cathode is then layered with the anode and the assembly impregnated as described above. The anode preferably is in the form of aluminum foil annealed and deeply etched to maximize its surface area.

Although the invention has been described with reference to particular embodiments, it is to be understood that such embodiments are merely illustrative of the application of the principles of the invention. Hence numerous other modifications may be made therein and other arrangements may be devised. While there have been shown and described what are presently considered to be the preferred embodiments of this invention, it will be obvious to those skilled in the art that various other changes may be made without departing from the broader aspects of the invention. It is, therefore, aimed in the appended claims to cover all such changes and modifications as fall within the true spirit and scope of the invention.

What is claimed is:

1. A method for construction of a substantially flat, low volume, high capacity storage device suitable for use in a cardiac defibrillator or pacemaker comprising an electrolytic capacitor having a gel or solid electrolyte, without a separate adhesive to maintain the spatial relation between the capacitor anode and cathode comprising preparing an etched anode by shaping a deeply etched anode foil to a planar configuration, de-oxygenating the anode and cathode, impregnating said etched anode with a polymerizable liquid electrolyte adapted to form an adhesive when polymerized, employing press means to maintain a planar cathode layer in contact with said liquid electrolyte, passing an electric current through said anode and cathode to form an oxide dielectric layer on said anode, polymerizing said liquid electrolyte, and removing said press means, wherein said capacitor anode and cathode are adhered by the polymerized electrolyte.

2. The method of claim 1, wherein said polymerized electrolyte comprises a metal salt in a polymer matrix.

3. The method of claim 1, wherein said electrolyte comprises hydroxyethylmethacrylate, ethylene glycol, ammonium adipate, ammonium glutarate and tetraethyleneglycol diacrylate.

4. The method of claim 1, wherein said electrolyte comprises 17.5 parts of hydroxyethylmethacrylate, 32.5 parts ethylene glycol, 7.0 parts ammonium adipate, 6.7 parts ammonium glutarate and 0.45 parts tetraethyleneglycol diacrylate.

* * * * *